Jan. 14, 1969   O. J. BROW ET AL   3,421,711
SEAT BELT RETRACTOR
Filed Nov. 15, 1963   Sheet 1 of 2
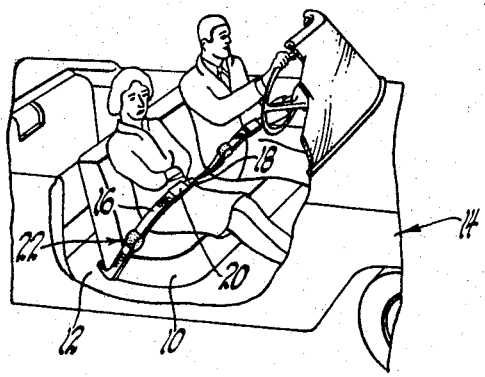
Fig. 1
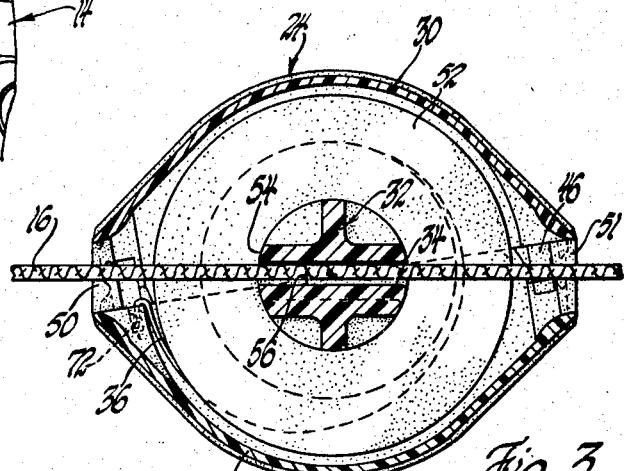
Fig. 3
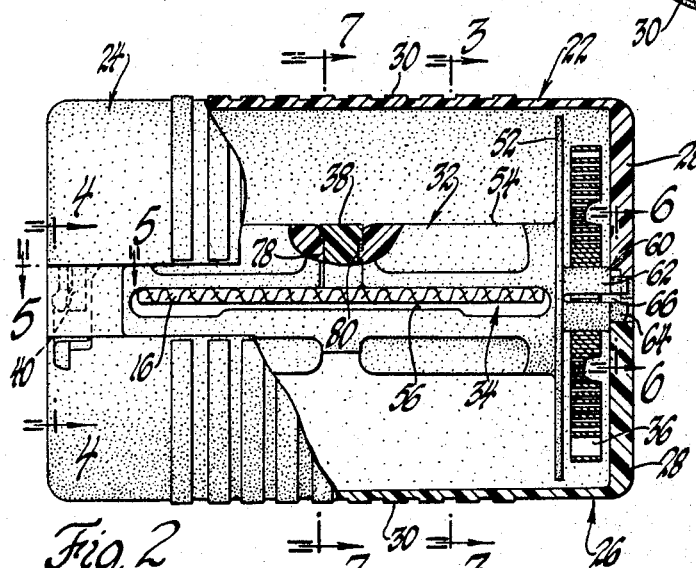
Fig. 2
Fig. 4
Fig. 5
INVENTORS
Orville J. Brow, &
BY Gene T. Jones
Hugh L. Fisher
ATTORNEY

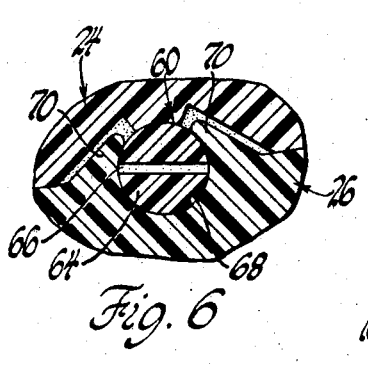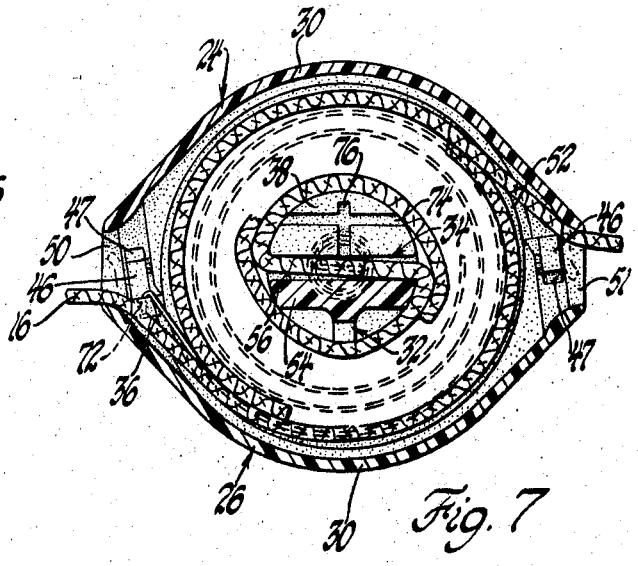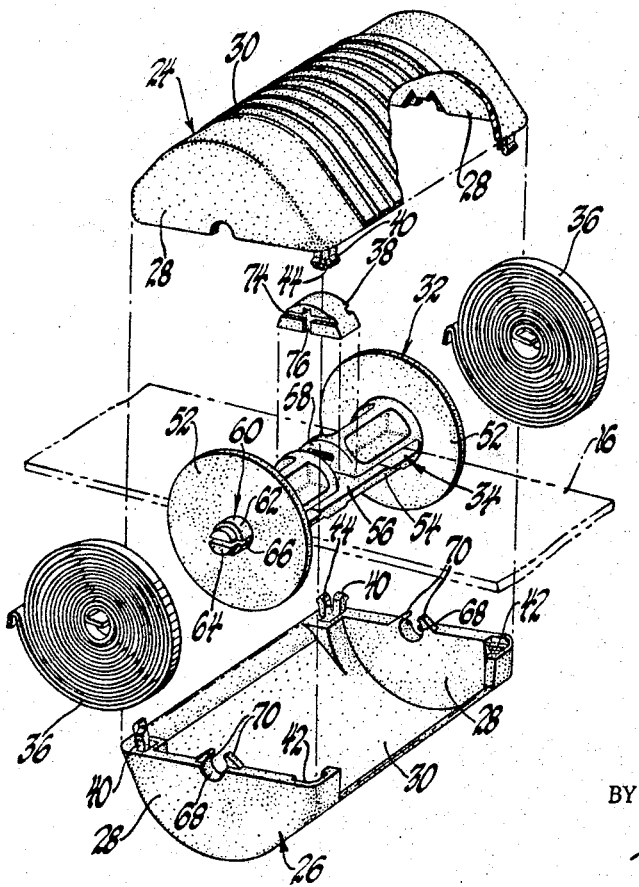

United States Patent Office 3,421,711
Patented Jan. 14, 1969

---

3,421,711
SEAT BELT RETRACTOR
Orville J. Brow, Taylor, and Gene T. Jones, Detroit, Mich., assignors to General Motors Corporation, Detroit, Mich., a corporation of Delaware
Filed Nov. 15, 1963, Ser. No. 324,001
U.S. Cl. 242—107.11                                5 Claims
Int. Cl. B65h 75/48

This invention relates to seat belt retractors and more particularly to a seat belt retractor which can be easily and quickly coupled to the conventional seat belt assembly to retract the seat belt when not in use.

Recently seat belts have gained wide acceptance with the motoring public as an important means of preventing or at least minimizing injuries to vehicle passengers during a collision or sudden stopping of the vehicle. Such seat belts are usually formed of two straps of webbing each secured at one end to the floor or frame of the vehicle and having cooperating buckle parts attached to the other end to secure the passenger in the seat.

One of the drawbacks associated with such seat belt assemblies is that when the belt is not in use, the free ends are usually found disarranged on the seat or on the floor where they may become soiled or caught in the vehicle door.

It has been suggested that apparatus be provided for automatically retracting the seat belt when not in use. Generally, the prior art retractors are mounted to the vehicle floor with one end of the seat belt attached thereto. Thus it is necessary for the seat belt and the retractor both to be assembled at the same time and placed in the motor vehicle as a unit. Another well-known type of retractor employs apparatus mounted within the seat and operable upon the conventional seat belt to retract it beneath the seat. As a practical matter this type of retractor must be placed in the seat by the motor vehicle manufacturer.

In accordance with the present invention, a simple but effective seat belt retractor is provided which may be easily coupled to seat belts which have previously been installed in motor vehicles. The preferred embodiment of the present invention provides a pair of detachable housing members one of which rotatably supports a spring biased reel. The reel is provided with a T-shaped slot to receive and trap a portion of the seat belt intermediate the ends thereof. The housing members are adapted to be fastened together to provide a generally cylindrical shaped enclosure having aligned openings through which the opposite ends of the seat belt extend. When the seat belt is fully extended to operative position, the retractor may be adjusted along the length of the seat belt to any position which the user may desire. When the seat belt is unbuckled, the opposite ends of the belt will be retracted into the enclosure.

A more complete understanding of the present invention may be had from the following detailed description which should be read in conjunction with the drawings in which:

FIGURE 1 is a perspective view of a motor vehicle with parts broken away to show a seat belt mounted therein and in its extended position with the retractor coupled thereto intermediate the ends thereof;

FIGURE 2 is an elevational view of the retractor with parts broken away and in sections;

FIGURE 3 is a sectional view taken along lines 3—3 of FIGURE 2;

FIGURE 4 is a sectional view taken along lines 4—4 of FIGURE 2;

FIGURE 5 is a sectional view taken along lines 5—5 of FIGURE 2;

FIGURE 6 is a sectional view taken along lines 6—6 of FIGURE 2;

FIGURE 7 is a sectional view taken along lines 7—7 of FIGURE 2 and showing the seat belt in its retracted position within the retractor;

FIGURE 8 is an exploded view of the seat belt retractor of the present invention.

Referring now to the drawings and initially to FIGURE 1, a seat 10 is secured to the floor 12 of a motor vehicle generally designated 14. A pair of seat belt assemblies are shown in their extended or operative position and each comprises two straps 16 and 18 of webbing or similar material each having one end secured to the floor 12 with the opposite ends joined by a suitable fastening device 20. A seat belt retractor generally indicated by the reference number 22 is shown coupled to each of the seat belt straps 16 and 18 intermediate the ends thereof.

Referring now to FIGURES 2 and 8, the seat belt retractor 22 comprises first and second housing members 24 and 26 each having a pair of end walls 28 and an intermediate side wall 30. A reel generally designated 32 is rotatably mounted in the end walls 28 of the housing member 26. The reel 32 is provided with a generally T-shaped slot indicated at 34 to receive a portion of the seat belt strap 16 intermediate the ends thereof. A pair of spiral springs 36 are provided for rotating the spool 32 to retract the opposite ends of the seat belt within the housing members 24 and 26. A closure member 38 is adapted to be received in the T-shaped slot 34 to prevent inadvertent escape of the seat belt strap 16.

Each of the housing members 24 and 26 may be formed of a suitable plastic material and is provided with a pair of fastening prongs 40 and cooperating prong sockets 42. Each of the prongs 40 is slotted at 44 to provide flexible prong segments 46. As more clearly shown in FIGURES 4 and 5, each of the prong segments 46 is provided with camming surfaces 47 adapted to engage corresponding camming surfaces 48 in the prong sockets 42. It will be apparent that as the prongs 40 enter the prong sockets 42, the prong segments 46 will initially be flexed inwardly and then return to their normal position to provide a detachable connection. Each of the side walls 30 has a portion cut away to provide guide slots 50 and 51 when the housing members 24 and 26 are joined together.

Returning now to FIGURES 2 and 8, the reel 32 which may be formed of a suitable plastic material includes a pair of circular flanges 52 separated by a central shaft or barrel 54. The barrel 54 is provided with a longitudinal slot 56 of sufficient size to accommodate the seat belt strap 16. A transverse slot 58 communicates with the longitudinal slot 56 thereby providing a generally T-shaped slot in the barrel 54. Trunnions 60 extend from each of the flanges 52 and comprise a first portion 62 of one diameter and a second portion 64 of reduced diameter. A slot 66 extends through the first and second portions 62 and 64. The second portion 64 of each of the trunnions 60 is adapted to be received in a bearing 68 formed by a pair of integral tongues or tabs 70 extending from the end walls 28 of the housing member 26. As best shown in FIGURE 6, the slot 66 in each of the trunnions 60 imparts resilience thereto which permits the portion 62 to pass through the opening between the tongues 70 when mounting the reel 32 in the bearings 68. While a relatively small amount of pressure is required to remove the reel 32 from the bearings 68, it will be apparent that the housing member 26 supports the reel 32 without the necessity of joining the housing members 24 and 26. This is an important factor in coupling the retractor 22 to the seat belt strap 16 as will become apparent hereinafter. As best shown in FIGURE 2, the portion 62 of each of the trunnions 60 defines a chamber for the spiral springs 36 between the end walls 28 and the flanges 52. One end of each of the spiral springs 36 extends within the slot 66, the opposite ends of the springs being bent so as to be received in the apertures 72 in the housing member 26.

As clearly shown in FIGURES 2, 7, and 8, the closure member 38 is provided with horizontal and vertical indentations 74 and 76 on opposite faces thereof. The indentations 74 and 76 are adapted to be engaged by opposed vertical and horizontal ridges 78 and 80 formed respectively in opposite faces of the transverse slot 58.

In order to operatively couple the retractor 22 to the seat belt strap 16, the reel 32 is first snapped into position in the housing member 26. The reel 32 is then rotated in a counterclockwise direction a suitable number of revolutions to provide sufficient tension in the springs 36 to retract the entire length of the seat belt when the reel 32 is released. A portion intermediate the ends of the seat belt strap 16 is then passed through the transverse slot 58 and into the longitudinal slot 56. The closure member 38 is snapped into the transverse slot 58 and the reel 32 is released to retract both ends of the seat belt. The housing member 24 is then joined with the housing member 26 providing an enclosure for the retracted seat belt. Once the seat belt straps have been extended to their operative position, the retractor 22 may be adjusted along the length of the seat belt strap to any position the passenger so desires.

In order to place the seat belt in use, it is merely necessary for the occupant of the seat to grasp the free ends of the belt straps 16 and 18 and fasten them across his lap. When the belt straps 16 and 18 are unfastened, the opposite ends of the straps will be retracted into the enclosure formed by the housing members 24 and 26 as shown in FIGURE 7. For safety purposes it is important that the seat belt straps be fully extended as shown in FIGURE 3 to provide a direct connection between the fastening device 20 and the vehicle floor 12. Any adjustment in the length of the belt due to the various sizes of the passengers should be accomplished at the fastening device 20.

It will be evident from the above description that the present invention provides a simple and economical seat belt retractor which may readily be coupled to seat belts which are already installed on motor vehicles to provide retraction thereof when not in use.

Although the description of this invention has been given with respect to a particular embodiment, it is not to be construed in a limiting sense. Any variations or modifications within the spirit and scope of the invention will now occur to those skilled in the art. For a definition of the invention, reference is made to the appended claims.

We claim:

1. In combination with a safety seat belt mounted in a motor vehicle, a seat belt retractor adapted to be adjustably coupled to said seat belt intermediate the ends thereof, said retractor comprising a first and second housing member each having a pair of end walls and an intermediate side wall, fastening means formed on said members for removably connecting said members together to form an enclosure, a guide slot formed in each of said side walls providing a passageway for said belt during extension and retraction thereof, a pair of tongues projecting from each of said end walls of one of said members, reel means adapted to be removably positioned for rotation in said tongues, said reel means having a generally T-shaped slot formed therein for receiving a portion of said seat belt intermediate the ends thereof, spring means connected between said housing and said reel means for normally, yieldingly urging said reel means in a direction to retract the opposite ends of said seal belt.

2. In combination with a safety seat belt mounted in a motor vehicle, a seat belt retractor adapted to be adjustably coupled to said seat belt intermediate the ends thereof, said retractor comprising first and second housing members, each of said housing members having a pair of end walls and an intermediate side wall, each of said members having a pair of integrally formed fastening prongs and cooperating prong sockets for detachably joining said members to form a hollow enclosure, a guide slot formed in each of said side walls providing a passageway for said belt during extension and retraction thereof, one of said members having a pair of tongues integrally formed on each of said end walls, a reel having opposed circular flanges integrally formed with a central shaft extending therebetween and integrally formed flexible trunnion means extending from opposite sides thereof adapted to be removably positioned in said tongues, said central shaft having a generally T-shaped slot formed therein for receiving a portion of said seat belt intermediate the ends thereof, spring means coupling said reel to one of said members for normally, yieldingly urging said reel in a direction to retract the opposite ends of said belt into said housing.

3. In combination with a safety seat belt adapted to be mounted in a motor vehicle, the seat belt retractor adapted to be adjustably coupled to said seat belt intermediate the ends thereof, said retractor comprising generally cylindrical shaped storage means, a reel rotatably mounted in said storage means and having a longitudinal slot extending therethrough sufficient to accommodate the width of said belt and a transverse slot extending from the surface of said reel and communicating with said longitudinal slot to permit insertion of said seat belt in said longitudinal slot, a closure member adapted to be removably inserted into said transverse slot to prevent inadvertent escape of said seat belt from said longitudinal slot, spring means connected between said reel and said storage means and normally, yieldingly urging said reel in a direction to retract the opposite ends of said seat belt into said storage means.

4. In combination with a safety seat belt mounted in a motor vehicle, a seat belt retractor adapted to be adjustably coupled to said seat belt intermediate the ends thereof, said retractor comprising first and second housing members having a pair of end walls and an intermediate side wall, each of said housing members having a pair of fastening prongs and cooperating prong sockets integrally formed therein for detachably joining said members to form a hollow enclosure, one of said members including bearing means comprising a pair of tongues integrally formed with and extending from each of said end walls, a reel having opposed circular flanges integrally formed on opposite ends of a central shaft, resilient trunnion means extending from said flanges and adapted to be removably positioned in said bearing means for rotatably supporting said reel, cooperating slots formed in each of said side members to accommodate passage of said belt during extension and retraction thereof, said central shaft having a longitudinal slot formed therein and a transverse slot communicating with said longitudinal slot to permit insertion of said belt into said longitudinal slot, a transverse ridge and a longitudinal ridge formed on opposite sides respectively of said transverse slot, a closure member having indentations on each side thereof adapted to cooperate with said ridges to provide a snap connection, first and second spiral springs positioned between said flanges and said end walls and connecting said reel with said housing for normally, yieldingly urging said seat belt in a direction to retract the opposite ends thereof into said enclosure.

5. In combination with a safety seat belt mounted in a motor vehicle, a seat belt retractor adapted to be adjustably coupled to said seat belt between the ends thereof, said retractor comprising first and second housing members having a pair of end walls interconnected by a laterally extending side wall, each of said housing members having a pair of fastening prongs and cooperating prong sockets, said prongs comprising prong segments which flex upon entering and leaving said prong sockets to permit nondestructive disassembling of said members while preventing inadvertent separation thereof, a reel having opposed circular flanges integrally formed on opposite ends of a central shaft, resilient trunnion means extending from said flanges, one of said members including a pair of tongues integrally formed with and extending from each of said end walls, said tongues defining an opening for receiving said reel means and releasably embracing said trunnion means, cooperating slots formed in each of said side members to accommodate passage of said belt during extension and retraction thereof, said central shaft having a longitudinal slot formed therein and a transverse slot communicating with said longitudinal slot to permit insertion of said belt into said longitudinal slot, a transverse ridge and a longitudinal ridge formed on opposite sides respectively of said transverse slot, a closure member having indentations on each side thereof adapted to cooperate with said ridges to provide a snap connection, first and second spiral springs positioned between said flanges and said end walls and connecting said reel with said housing for normally, yieldingly urging said reel in a belt retracting direction.

References Cited
UNITED STATES PATENTS

| | | | |
|---|---|---|---|
| 485,664 | 11/1892 | Schubert | 242—74 |
| 1,313,644 | 8/1919 | Simon | 242—107 |
| 2,541,476 | 2/1951 | Mihalyi | 242—71 |
| 2,720,332 | 10/1955 | Holt | 220—60 |
| 2,814,504 | 11/1957 | Campbell | 297—388 |

CASMIR A. NUNBERG, *Primary Examiner.*

U.S. Cl. X.R.

297—388